March 23, 1954  H. E. ALTGELT  2,672,920
VEHICLE SEAT
Filed Nov. 9, 1950
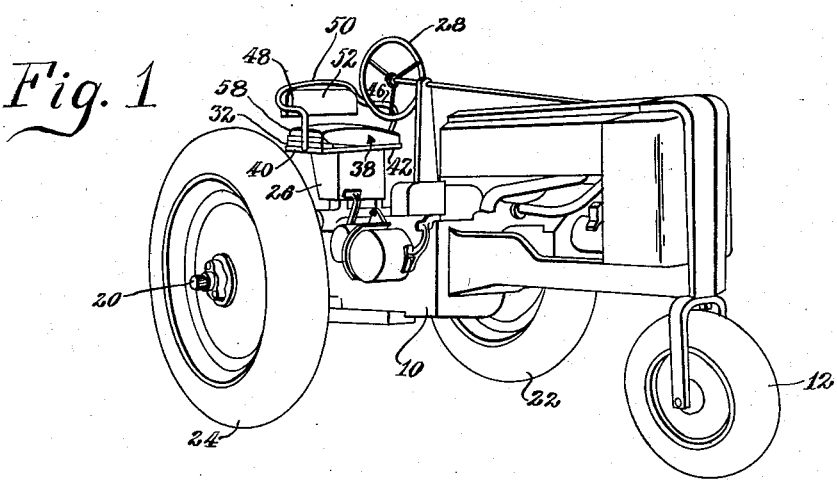
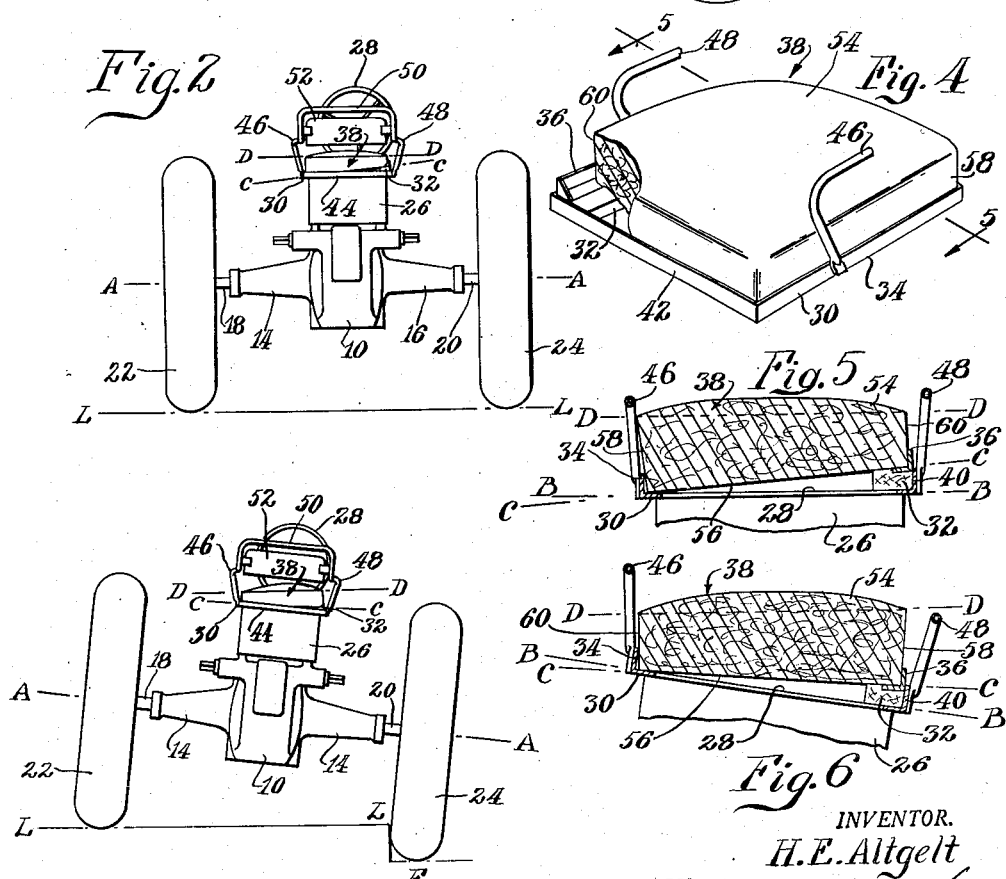
INVENTOR.
H. E. Altgelt
BY
Parker and McKnoth
Attorneys Patented Mar. 23, 1954

2,672,920

UNITED STATES PATENT OFFICE 2,672,920

VEHICLE SEAT

Herman E. Altgelt, Moline, Ill., assignor to Deere & Company, Moline, Ill., a corporation of Illinois Application November 9, 1950, Serial No. 194,785

4 Claims. (Cl. 155—121)

This invention relates to a vehicle seat structure and more particularly to a seat that is reversible from side to side to provide at all times a substantially level surface for carrying a rider or operator regardless of the slope—within limits—of the terrain over which the vehicle travels.

The invention finds its greatest utility in use on an agricultural tractor, because such tractor, in addition to normal operation over relatively level fields, is used for plowing in which one wheel runs in a furrow, thus causing the tractor to lean to one side. Unless some special provision is made for adjusting the seat or operator's platform, the normally level seating or standing surface is inclined to the horizontal, resulting in discomfort to the operator. Various forms of mechanism to compensate for the leaning of the seat or platform are known, but all of these are quite expensive and are difficult to adjust and maintain.

According to the present invention, the problem is eliminated by the simple expedient of a rider-carrying part or seat that is reversible from side to side and associated with appropriately designed supports so that it presents an upper carrying surface that will be level whether the tractor is operated on the level or with one wheel in the furrow. It is an object of the invention to simplify the seat structure so that it may be readily adapted to tractors and other vehicles of known designs. It is a further object of the invention to provide a seat structure in which only the seat cushion need be reversed from side to side to accommodate the different operating positions of the tractor.

The foregoing and other important objects and desirable features inherent in and encompassed by the invention will become apparent as a preferred embodiment is disclosed in the following detailed description and accompanying sheet of drawings in which:

Figure 1 is a perspective view of an agricultural tractor, equipped with the improved seat structure.

Figure 2 is a rear elevational view of the tractor, showing the position which the seat structure will occupy during operation on the level.

Figure 3 is a similar view showing the tractor with one wheel running in a furrow.

Figure 4 is a perspective view, with portions broken away, showing some of the details of the seat structure.

Figure 5 is a transverse sectional view taken substantially on the line 5—5 of Figure 4 and showing the relationship between the seat cushion and its supports in accordance with the operation of the tractor as shown in Figure 2.

Figure 6 is a view similar to Figure 5, but relating to operation of the tractor as shown in Figure 3.

The tractor chosen for the purpose of illustration is merely typical of tractors or vehicles in general subject to operating conditions of the type to be hereinafter described. This tractor comprises a longitudinal body 10 carried at its forward end on a rolling ground-engaging element in the form of a single steerable wheel 12 and having at its rear end laterally outwardly extending axle housings 14 and 16 which respectively carry axles 18 and 20 to which are respectively secured rear rolling ground-engaging elements in the form of traction wheels 22 and 24. In the particular form of tractor illustrated, the rear portion of the body 10 carries mounting structure 26 conventionally utilized to carry a seat behind a steering wheel 28 for steering the front wheel 12. The details of the seat illustrated here will be described below.

In Figure 2, the tractor is shown as operating over a level field, the ground line being designated generally by the letters L—L. The traction wheels 22 and 24 have a common transverse axis A—A which, in Figure 2, is parallel to the ground line L—L. In Figure 3 the tractor is shown as operating over a field that is being plowed, wherefore the right hand traction wheel 24 will operate in a furrow F. The depth of the furrow may vary but a mean depth of approximately six inches may be assumed for present purposes. If the tread or transverse spacing between the traction wheels 22 and 24 be assumed to be about fifty-six inches, the angle of inclination of the axis A—A to the ground line L—L in Figure 3 will be approximately six degrees. In the conventional tractor, the aforesaid inclination of the axis A—A to the ground causes a corresponding list or tilt of the operator's seat, resulting in discomfort to the operator. According to the present invention, provision is made for selectively reversing a part of the seat structure to accommodate operation of the tractor as in either Figure 2 or Figure 3.

As best shown in Figures 5 and 6, the upper portion of the mounting structure 26 presents an upper surface 28 including a line B—B that is parallel to the axis A—A and which, when the tractor is operated as in Figure 2, will be level or horizontal. This surface has a pair of laterally spaced apart supports 30 and 32. The top portion of the support 32 is higher by a predetermined distance than the top portion of the support 30. In the particular instance illustrated, the difference in height of the supports 30 and 32 above the axis A—A is such that a line C—C drawn transversely across and connecting the top portions of the supports is at an angle to the axis A—A substantially equal to the angle between the axis A—A and the horizontal when the tractor is operated as in Figure 3.

The supports 30 and 32 respectively include longitudinal retaining members in the form of angles 34 and 36 which support and retain a seat cushion 38. The support 32 includes a lower angle 40 below and parallel to the angle 36. The angles 34 and 40 are joined at their front ends by a transverse member or angle 42 and are joined at their rear ends by a second transverse angle 44. To the side angles 34 and 40 are respectively affixed arm rests 46 and 48 which extend upwardly and rearwardly and merge into a transverse bight 50. A back rest 52 is carried below the bight 50 and between the arm rests 46 and 48. The arm rests and the back rest are fixed relative to the mounting structure 26 and always remain in their normal position regardless of reversibility of the seat cushion 38.

The seat cushion has an upper surface 54 which, although shown as being upwardly convex, is deformable by the weight of a rider to what may be considered a horizontal plane surface including a horizontal line D—D. For the purpose of the following description the relaxed convexity of the surface 54 will be ignored. The seat cushion has a bottom surface 56 and opposite side elements 58 and 60. These sides are different vertical dimensions so that the side 58 is relatively long and the side 60 is relatively short as respects its vertical extent below the upper surface 54 (or below the line D—D). The relationship between the upper and lower surfaces 54 and 56 is such that they converge from the side 58 toward the side 60 at an angle substantially equal to the angle between the axis A—A and the ground line L—L when the tractor is operated as in Figure 3.

The side elements 58 and 60 are laterally spaced apart on the order of the lateral spacing between the seat supports 30 and 32 and the bottom portions of the lower surface 56 at opposite sides of the seat are respectively removably receivable by the supports in such manner that the seat may be selectively reversed from side to side to accommodate differences in seating characteristics according to whether the tractor is operated on the level as in Figure 2 or with one wheel in the furrow as in Figure 3. When the tractor is operated on the level, the seat cushion 38 is positioned as in Figure 5. The bottom portion at the side 58 is received by the low support 30 and the bottom portion at the shorter side 60 is received by the high support 32. Since the axis A—A is now level, the plane that includes the line C—C will be at an angle above this axis. However, because of the position of the seat cushion, this angle is neutralized or balanced by the angle of convergence between the upper surface 54 and lower surface 56. Stated otherwise, when the seat is in this position, the angle of the surface 54 to the axis A—A is equal to the difference between the angle between D—D and C—C and the angle between C—C and A—A.

On the other hand, when the tractor is operated as in Figure 3, the seat cushion is reversed as shown in Figure 6, so that the longer or higher side 58 of the seat cushion is carried by the higher support 32 and the lower side 60 is carried by the lower support 30. The axis A—A is now at an angle to the ground line L—L. However, the upper surface of the seat cushion will be level since the angle between D—D and A—A is equal to the sum of the angles between D—D and C—C and C—C and A—A. Since the last two mentioned angles are equal, it follows that the angle between D—D and A—A is equal to twice the angle between C—C and A—A.

One of the important features of the invention is its simplicity. The seat cushion is, as has been described, wedge-shaped as viewed from the front or rear. The angle of convergence between the upper surfaces of the seat cushion is related to the difference in height of the seat supports, so that the seat is selectively reversible from side to side as aforesaid. The particular dimensions chosen are based upon a mean or average plowing depth. Other dimensions could be similarly used and adapted.

Various other features not specifically enumerated herein will undoubtedly occur to those versed in the art, as well as various modifications and alterations in the preferred embodiment of the invention illustrated, all of which may be achieved without departing from the spirit and scope of the invention as defined in the appended claims.

I claim:

1. In a vehicle of the type having a longitudinal body carried in a normally level position by and between a pair of laterally spaced apart rolling ground-engaging elements, the improvement residing in structure for carrying a rider on the vehicle, comprising: a pair of laterally spaced apart supports having top portions spaced at different distances above a normally horizontal transverse axis so that a line drawn transversely across and connecting said top portions is at a predetermined angle to said axis; a rider-carrying part having an upper surface and a pair of side elements spaced apart laterally on the order of the spacing of the supports and including bottom portions spaced at different distances below said surface so that the angle between said surface and a line drawn across and connecting said bottom portions is substantially equal to the aforesaid predetermined angle; and said bottom portions being removably receivable by said top portions of the supports and said rider-carrying part being selectively reversible from side to side to position said upper surface either parallel to said axis or at an angle to said axis substantially equal to twice the aforesaid predetermined angle.

2. In a vehicle of the type having a longitudinal body carried in a normally level position by and between a pair of laterally spaced apart rolling ground-engaging elements, the improvement residing in structure for carrying a rider on the vehicle, comprising: a pair of laterally spaced apart supports having top portions spaced at different distances above a normally horizontal transverse axis so that a line drawn transversely across and connecting said top portions is at a predetermined angle to said axis; a rider-carrying part having an upper surface and a pair of side elements spaced apart laterally on the order of the spacing of the supports and including bottom portions spaced at different distances below said surface so that a line drawn across and connecting said bottom portions is at a second predetermined angle to said top surface; and said bottom portions being removably receivable by said top portions of the supports and said rider-carrying part being selectively reversible from side to side to position said upper surface either at an angle to said axis equal to the difference between said predetermined angles or at an angle to said axis equal to the sum of said predetermined angles.

3. In a vehicle of the type having a longitudinal body carried in a normally level position by and between a pair of laterally spaced apart rolling ground-engaging elements, the improvement residing in structure for carrying a rider on the vehicle, comprising: a pair of laterally spaced apart supports having top portions spaced at different distances above a normally horizontal transverse axis so that a line drawn transversely across and connecting said top portions is at a predetermined angle to said axis; a seat cushion having an upper surface and a lower surface, and opposite sides spaced laterally apart on the order of the spacing between said supports, one of said sides being higher than the other and said upper and lower surfaces converging from the higher to the lower side at an angle substantially equal to the aforesaid predetermined angle; and said bottom surface being removably receivable by the top portions of the supports and said seat being selectively reversible from side to side to position said upper surface either parallel to said axis or at an angle to said axis substantially equal to twice the aforesaid predetermined angle.

4. In a vehicle of the type having a longitudinal body carried in a normally level position by and between a pair of laterally spaced apart rolling ground-engaging elements, the improvement residing in structure for carrying a rider on the vehicle, comprising: a pair of laterally spaced apart supports carried by the vehicle body and having top portions spaced at different distances above a normally horizontal transverse axis so that one of said portions is relatively high and the other is relatively low as respects said axis; a rider-carrying part having an upper surface and a pair of side elements spaced apart laterally on the order of the spacing of said supports, one of said side elements having different vertical dimensions so that one side element is relatively long and the other is relatively short as respects its vertical extent below said upper surface; and said side elements having bottom portions removably and selectively receivable by the top portions of the supports for mounting of the seat in either of two positions, in one of which positions the long and short side elements are carried respectively by the high and low supports, and in the other of which positions the seat is reversed from side to side and the long and short side elements are respectively carried by the low and high supports.

HERMAN E. ALTGELT.

References Cited in the file of this patent

UNITED STATES PATENTS

| Number | Name | Date |
|---|---|---|
| 277,544 | Chappel | May 15, 1883 |
| 1,379,771 | McKinley | May 31, 1921 |
| 1,977,520 | McCoy | Oct. 16, 1934 |
| 2,265,901 | Greig | Dec. 9, 1941 |
| 2,489,981 | Rose | Nov. 29, 1949 |